(12) United States Patent
Barjesteh et al.

(10) Patent No.: US 6,253,436 B1
(45) Date of Patent: Jul. 3, 2001

(54) UNIVERSAL VALVE CORE REMOVAL TOOL AND KIT

(75) Inventors: Michael Barjesteh, Denville, NJ (US); Nader Barjesteh, Woodbury, MN (US)

(73) Assignee: Mastercool, Inc., Randolph, NJ (US)

( * ) Notice: Subject to any disclaimer, the term of this patent is extended or adjusted under 35 U.S.C. 154(b) by 0 days.

(21) Appl. No.: 09/635,977

(22) Filed: Aug. 9, 2000

(51) Int. Cl.⁷ .................................................. B23P 19/04
(52) U.S. Cl. .................................. 29/213.1; 29/890.121; 29/237
(58) Field of Search .................. 29/213.1, 890.121, 29/890.124, 214, 426.5, 237, 240, 256, 257, 221.5; 137/15, 315, 317, 327; 251/319; 62/77, 292

(56) References Cited

U.S. PATENT DOCUMENTS

| | | |
|---|---|---|
| 2,517,870 * | 8/1950 | Gump ............................. 29/213.1 |
| 3,935,713 | 2/1976 | Olson . |
| 4,305,193 | 12/1981 | Anderson . |
| 4,550,481 * | 11/1985 | Preston ............................. 29/213 R |
| 4,563,803 | 1/1986 | Dimoff . |
| 4,597,147 * | 7/1986 | Henry ............................. 29/213 R |
| 4,599,776 * | 7/1986 | Haggard et al. ................... 29/213 R |
| 4,706,357 | 11/1987 | Ewing . |
| 5,228,178 | 7/1993 | Stickley . |
| 5,472,011 * | 12/1995 | St. Marie ............................. 137/315 |
| 5,842,260 | 12/1998 | Todd, III et al. . |
| 5,915,740 * | 6/1999 | Weitner ............................. 29/213.1 |

* cited by examiner

Primary Examiner—Joseph J. Hail, III
Assistant Examiner—Daniel Shanley
(74) Attorney, Agent, or Firm—Mathews, Collins Shepherd & Gould P.A.

(57) ABSTRACT

A tool for a pressurized refrigeration system having a valve with a removable valve core comprises: a valve assembly having a first opening and a second opening and a shut-off valve, the shut-off valve adapted to close and open a passageway between the first opening and the second opening; a valve adapter coupled to the first opening, wherein the valve adapter is adapted to couple to the valve; and, a shaft assembly coupled to the second opening, the shaft assembly having a shaft adapted to move through the passageway, when the shut-off valve is open, and engage the removable valve core. The removable valve core can be removed, while under pressure, from the valve, by rotating the shaft to extract the removable valve core in a controlled manner.

20 Claims, 3 Drawing Sheets

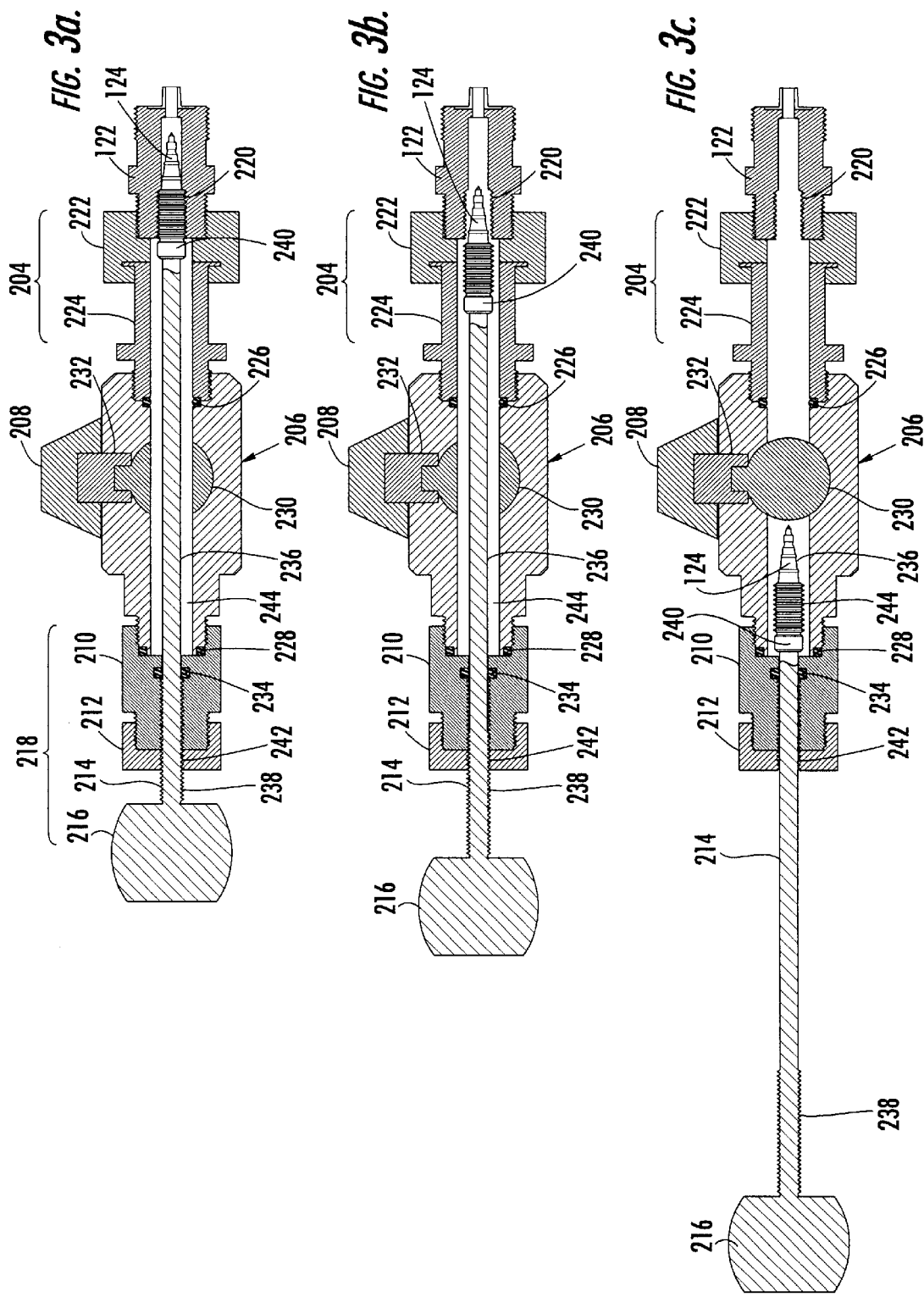

UNIVERSAL VALVE CORE REMOVAL TOOL AND KIT

FIELD OF THE INVENTION

The present invention relates generally to a tool for removing valve elements, and more particularly to a tool for removing valve elements from pressurized air conditioning systems.

BACKGROUND OF THE INVENTION

It is a common practice when servicing a pressurized refrigeration system to remove and replace threaded valves without depressurizing the system by removing or losing the refrigerant gas. Environmental concerns have added greater emphasis on the efficiency of this process. The pressures typically encountered in such systems vary from 75 p.s.i. to 250 p.s.i. or higher. The valve cores and thread sizes etc. are standardized (although there are a variety of standards), making it possible to attach a standard tool to the valve fitting, through which the valve core can be passed, after which the passage through the tool is closed. A high quality sealing mechanism is crucial to maintain pressure when the core is removed, and the need to open an access way to the core complicates matters.

It is known that valve cores, such as the Schrader-type used in refrigeration systems are typically not subject to high quality control. Resulting in a significant number valve cores that are initially installed in refrigeration systems being incapable of maintaining the proper operating pressure to permit efficient operation of the refrigeration system. Additionally, refrigeration systems, while they arc intended to be closed (sealed) systems, are actually made from a number of other components, with various fittings and seals, subject to leakage. It is necessary to repair and recharge the refrigeration systems in an efficient way, such as through the removal of the core valve, thus providing access for refrigerant removal, system evacuation and recharge. The removal of the core valve, which is under high pressure, will tend to blow out the core valve, until the interior pressure of the tool is equalized.

Such needs, together with the substantial operating pressures make it necessary to provide a device of great precision as well as very sturdy construction. The tools typically used for this purpose have been of relatively complicated construction, making them prone to leak, and/or less dependable and thus expensive to manufacture than necessary.

Accordingly, there is a need for a tool for efficiently and safely removing valve elements from pressurized air conditioning systems.

SUMMARY OF THE INVENTION

The present invention is a tool for a pressurized refrigeration system having a valve with a removable valve core. The tool comprises: a valve assembly having a first opening and a second opening and a shut-off valve, the shut-off valve adapted to close and open a passageway between the first opening and the second opening; a valve adapter coupled to the first opening, wherein the valve adapter is adapted to couple to the valve; and, a shaft assembly coupled to the second opening, the shaft assembly having a shaft adapted to move through the passageway, when the shut-off valve is open, and engage the removable valve core. The removable valve core can be removed, while under pressure, from the valve, by rotating the shaft to extract the removable valve core in a controlled manner.

DESCRIPTION OF THE DRAWINGS

A more complete understanding of the present invention may be obtained from consideration of the following description in conjunction with the drawings in which:

FIG. 3a is a cross sectional view of the present invention, universal valve core removal tool coupled to an access fitting with the removable valve core seated;

FIG. 3b is a cross sectional view of the present invention, universal valve core removal tool, coupled to an access fitting with the removable valve core just removed from its seat; and, FIG. 3c is a cross sectional view of the present invention, universal valve core removal tool, coupled to an access fitting with the removable valve core positioned for replacement.

DETAILED DESCRIPTION OF VARIOUS ILLUSTRATIVE EMBODIMENTS

Although the present invention, universal valve core removal tool and kit, is particularly well suited for use with air conditioning refrigeration systems and shall be so described, it is equally well suited for use in other continuous pressurized systems, including heating systems such as those utilizing heat pumps.

Figure 1:
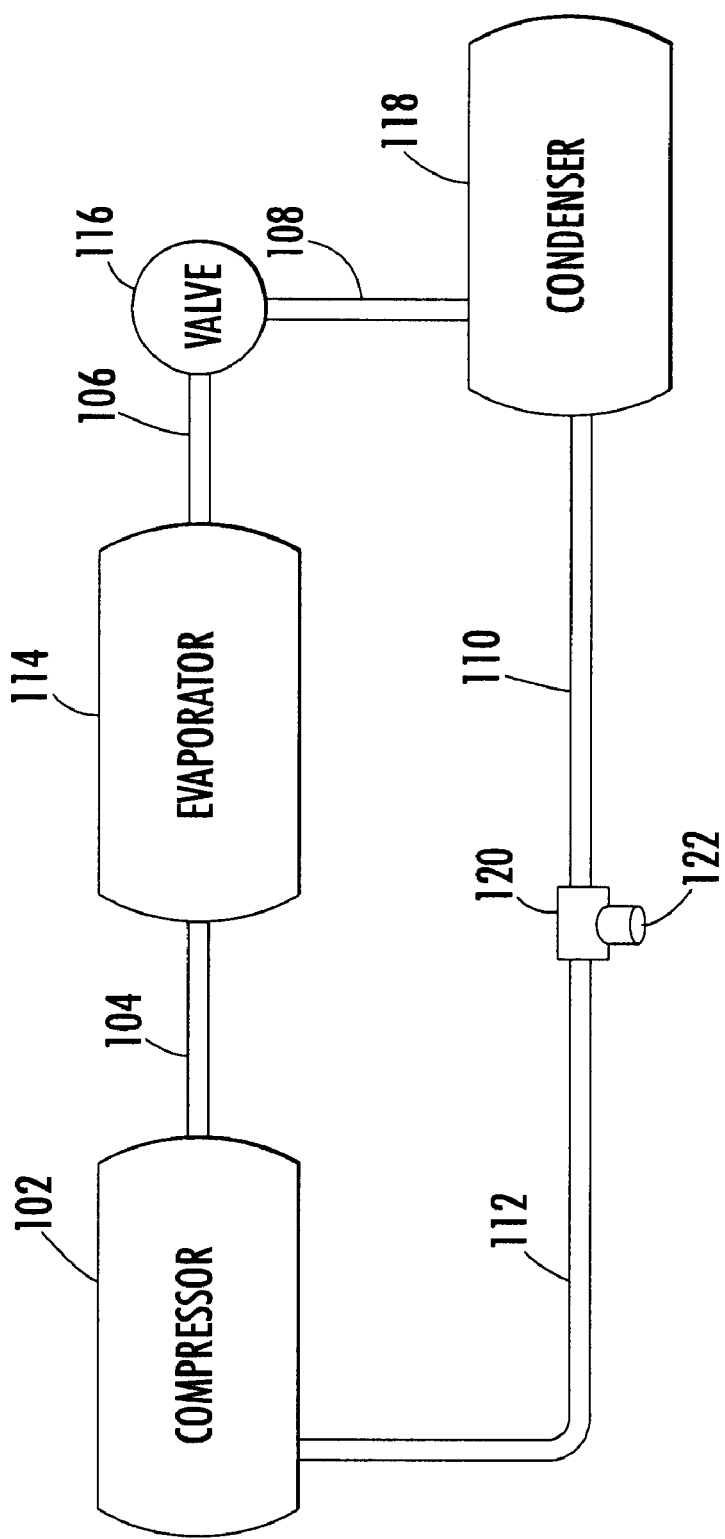
FIG. 1 is a schematic view of a pressurized air conditioning refrigeration system, which utilizes the present invention.

Referring to FIG. 1 there is shown a simplified schematic view of a pressurized air conditioning refrigeration system, which utilizes the present invention, universal valve core removal tool and kit. The pressurized air conditioning refrigeration system comprises a compressor 102, connective conduits 104, 106, 108, 110 and 112, an evaporator 114, an expansion valve 116, a condenser 118, and an access fitting 120, which form a closed loop. The compressor 102 is coupled by a first connective conduit 104 to the evaporator 114. A second connective conduit 106 couples the evaporator 114 to the expansion valve 116. A third connective conduit 108 couples the expansion valve 116 to the condenser 118. A fourth connective conduit 110 couples the condenser 118 to the access fitting 120. A fifth connective conduit 112 couples the access fitting 120 to the compressor, thus completing the closed loop. The access fitting 120 has a valve 122 with removable core (not shown).

Figure 2:
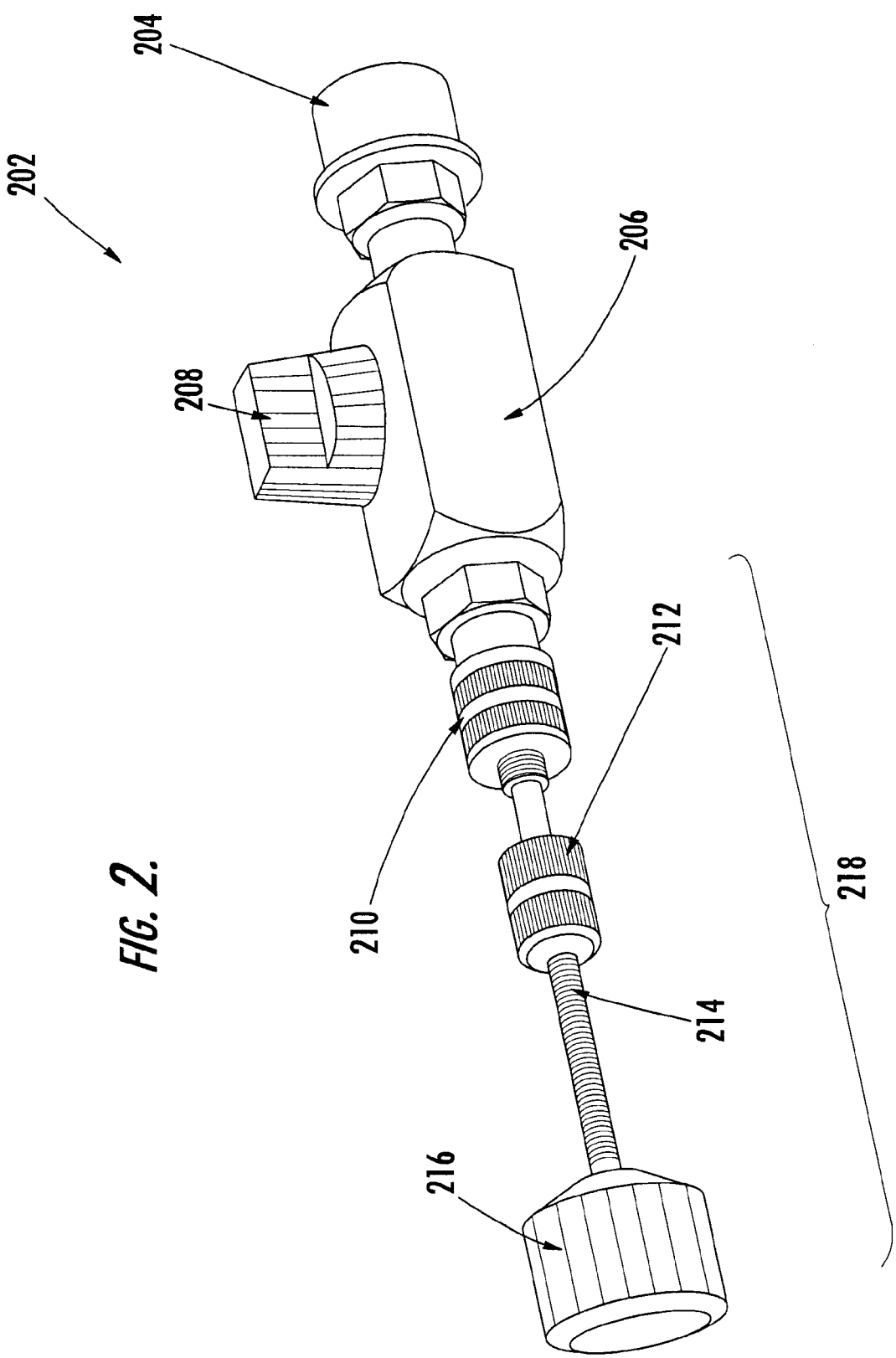
FIG. 2 is a perspective view of the present invention, universal valve core removal tool.

Referring to FIG. 2 there is shown a perspective view of the present invention, universal valve core removal tool 202. The universal valve core removal tool 202 is comprised of an interchangeable adapter 204, a value assembly 206 with value knob 208, a shaft connection nut 210, a shaft control nut 212, an interchangeable shaft 214 with a shaft knob 216. The interchangeable adapter 204 is coupled to the valve assembly 206 for easy user interchangeability while providing a pressure tight seal. The interchangeable shaft assembly 218 is comprised of the shaft connection nut 210, shaft control nut 212, and interchangeable shaft 214 with shaft knob 216. The interchangeable shaft 214 is coupled to the valve assembly 206 for easy user interchangeability while providing a pressure tight seal.

A variety of interchangeable adapters 204 are supplied in one embodiment, including: 3/16" female high pressure side; 1/8" female high pressure side, R134a high pressure side 16 mm connector; and, an R134a low pressure side 13 mm connector. Additional interchangeable adapters 204 can be easily be coupled to the valve assembly 206.

A variety of interchangeable shaft assemblies 218 are supplied in one embodiment, including: standard valve core shaft; GM large bore valve core shaft; JRA R134a valve core shaft; Eaton R134a low pressure side valve core shaft; and Eaton R134a high pressure side valve core shaft. Additional interchangeable shaft assemblies 218 can be easily be coupled to the valve assembly 206. The interchangeable shaft 214 has an end, opposite the shaft knob 216, which is adapted for removal of a corresponding valve core. The pitch of the interior threads 242 of the shaft control nut 212 correspond to the pitch of the interior threads 220 of the valve 122, thus synchronizing the extraction of the removable valve core 124 with the withdrawal of the interchangeable shaft 214.

Operation of the universal valve core removal tool 202 involves selecting a suitable interchangeable adapter 204 and interchangeable shaft assembly 218, which are then securely fitted to the valve assembly 206. The selected interchangeable adapter 204 is coupled to the valve 122. Thus enabling removal of the removable valve core.

When the removable valve core is unthreaded from the access fitting 120, there is typically high pressure in the air conditioning refrigeration system. This high-pressure forces the removable valve core and extracting shaft to pop out, which can damage the interior threads of the valve. A partially threaded section of the interchangeable shaft 214 enables the controlled removal of the removable valve core, and equalization of the pressure, thus avoiding thread damage to the valve and potential injury to the operator.

Referring to FIGS. 3a, 3b and 3c there are shown cross sectional views of the present invention, universal valve core removal tool 202, coupled to the valve 122 with the removable valve core 124 in various positions. Similar components are numbered the same. The valve 122 has interior threads 220 which secure the removable valve core 124. The interchangeable adapter 204 contains a valve adapter 222, which corresponds to a particular type of valve 122, and an interface fitting 224. Valve assembly 206 contains a first seal 226 and a second seal 228. The valve assembly contains a quarter turn valve 230 which is coupled by a valve shaft 232 to the valve knob 208. While the quarter turn valve 230 is shown as a spherical valve, other geometries are equally well suited.

The interchangeable shaft 214 has a threaded portion 238 near the shaft knob 208 and a smooth portion 236, which extends to the tool head 240. The shaft-connecting nut 210 has a shaft seal 234, which enables the smooth portion 236 of the interchangeable shaft 214 to slide while maintaining a pressure seal. The tool head 240 is a slightly larger diameter than the smooth portion 236, thus acting as a stop with the shaft-connecting nut 210 when the interchangeable shaft 214 is withdrawn from the valve assembly 206.

Referring to FIG. 3a, there is a cross sectional view of the present invention, universal valve core removal tool, coupled to an access fitting with the removable valve core seat. The interchangeable adapter 204 is securely coupled to the valve 122. With the quarter turn valve 230 in the open position, interchangeable shaft assembly 218 is installed by attaching the shaft connecting nut to the valve assembly 206 and sliding the interchangeable shaft 214 through a passageway 244 so that the tool head 240 engages the removable valve core 124. The shaft control nut 212 is screwed onto the shaft-connecting nut 210.

Referring to FIG. 3b is shown a cross sectional view of the present invention, universal valve core removal tool, coupled to an access fitting with the removable valve core just removed from its seat. The removable valve core 142 is then unthreaded by turning the shaft knob 216 counterclockwise. While the removable valve core 142 is being unthreaded from the valve 122, the threaded portion 238 of the interchangeable shaft 214 is engaged by interior threads 242 of the shaft control nut 212. This enables the controlled removal of the removable valve core 124, and equalization of the pressure, thus avoiding damage to the interior threads 220 of the valve 122 and potential injury to the operator.

Referring to FIG. 3c there is shown a cross sectional view of the present invention, universal valve core removal tool, coupled to an access fitting with the removable valve core positioned for replacement. Once the removable valve core 124 has been extracted from its seat (shown in FIG. 3b) the shaft knob 216 is further rotated counterclockwise until the threaded portion 238 of the interchangeable shaft 214 is no longer engaged by the interior threads 242 of the shaft control nut 212. The interchangeable shaft 214 can now slide while maintaining a pressure seal until the tool head 240, which is a slightly larger diameter than the smooth portion 236, acts as a stop with the shaft connecting nut 210. Having withdrawn the interchangeable shaft 214 with the removable valve core 124, the quarter turn valve 230 may be rotated to close the passage 244, isolating the removable valve core 124 from the pressurized air conditioning refrigeration system. The shaft connecting nut 210 may be unscrewed from the valve assembly 206, providing access to the removable valve core 124 for inspection, testing and replacement. Access is also now available to evacuate and recharge the pressurized air conditioning refrigeration system.

While the interchangeable shaft assembly 218 and the interchangeable adapter 204 are described as coupled to the valve assembly 206 by threaded couplings, other forms of coupling which maintain an effective pressure seal are equally well suited, including but not limited to snap couplings, bayonet fittings, and quick release fittings.

To reinstall the removable valve core 124, the tool head 240 is engaged to the removable valve core 124. The shaft-connecting nut 210 is coupled to the valve assembly 206. The quarter turn valve 230 is opened creating a passageway 244 through which the tool head 240 engaged to the removable valve core 124 can pass. When the removable valve core 124 starts to engage the interior threads 220 of the valve 122, the shaft control nut 212 is screwed onto the shaft-connecting nut 210. The shaft knob 216 is rotated clockwise to seat the removable valve core 124 in the valve 122. When the removable valve core 124 has been seated, the shaft control nut 212 is removed enabling the interchangeable shaft 214 to be withdrawn through the passage 244 without rotating the seated removable valve core 124. The valve adapter 222 may now be removed from the valve 122.

Numerous modifications and alternative embodiments of the invention will be apparent to those skilled in the art in view of the foregoing description. While the interchangeable shaft assembly and the interchangeable adapter are described as coupled to the valve assembly by threaded couplings, other forms of coupling which maintain an effective pressure seal are equally well suited. While the quarter turn valve is shown as a spherical valve, other geometries as well as other types of valves are equally well suited. Accordingly, this description is to be construed as illustrative only and is for the purpose of teaching those skilled in the art the best mode of carrying out the invention. Details of the structure may be varied substantially without departing from the spirit of the invention and the exclusive use of all modifications, which come within the scope of the appended claims, is reserved.

What is claimed:

1. The tool for a pressurized refrigeration system having a valve with a removable valve core, comprising:
 a valve assembly having a first opening and a second opening and a shut-off valve, said shut-off valve having positions to close and open a passageway between said first opening and said second opening;
 a valve adapter for coupling to the valve, said valve adapter coupled to said first opening; and,
 a shaft assembly coupled to said second opening, said shaft assembly having a shaft to move through said passageway, when said shut-off valve is open, and engage the removable valve core, said shaft further having a threaded portion controlling axial movement of said shaft through said passageway;
 wherein the removable valve core can be removed, while under pressure, from the valve, in that rotating said shaft provides controlled extraction of the removable valve core.

2. The tool as recited in claim 1 wherein said shut-off valve comprises a quarter turn valve.

3. The tool as recited in claim 1 wherein said shut-off valve comprises a spherical valve.

4. The tool as recited in claim 1 wherein said shut-off valve comprises a cylindrical valve.

5. The tool as recited in claim 1 wherein said shut-off valve comprises a gate valve.

6. The tool as recited in claim 1 wherein said shaft threaded portion disengages after the removable core is extracted.

7. The tool as recited in claim 1 wherein said shaft assembly is coupled by a threaded fitting to said second opening.

8. The tool as recited in claim 1 wherein said valve adapter is coupled by a threaded fitting to said first opening.

9. The tool as recited in claim 1 wherein the threaded portion has a pitch corresponding to a pitch of the removable valve core.

10. A tool kit for a pressurized refrigeration system having a valve with a removable valve core, comprising:
 a valve assembly having a first opening and a second opening and a shut-off valve, said shut-off valve having positions to close and open a passageway between said first opening and said second opening;
 at least one interchangeable adapter for coupling to the valve, removably coupled to said first opening; and,
 at least one interchangeable shaft assembly removably coupled to said second opening, said interchangeable shaft assembly having a shaft to move through said passageway, when said shut-off valve is open, and engage the removable valve core, said interchangeable shaft having a threaded portion controlling axial movement of said shaft through said passageway;
 wherein the removable valve core can be removed while under pressure, from the access fitting.

11. The tool kit as recited in claim 10 wherein said shut-off valve comprises a quarter turn valve.

12. The tool kit as recited in claim 10 wherein said shut-off valve comprises a spherical valve.

13. The tool kit as recited in claim 10 wherein said shut-off valve comprises a cylindrical valve.

14. The tool kit as recited in claim 10 wherein said shut-off valve comprises a gate valve.

15. The tool kit as recited in claim 10 wherein said shaft threaded portion disengages after the removable core is extracted.

16. The tool kit as recited in claim 10 wherein said least one interchangeable shaft assembly is coupled by a threaded fitting to said second opening.

17. The tool kit as recited in claim 10 wherein said least one interchangeable valve adapter is coupled by a threaded fitting to said first opening.

18. The tool kit as recited in claim 10 wherein the threaded portion has a pitch corresponding to a pitch of the removable valve core.

19. The tool kit as recited in claim 10 further comprising a second interchangeable adapter, adapted to be removably coupled to said first opening.

20. The tool kit as recited in claim 10 further comprising a second interchangeable shaft assembly, adapted to be removably coupled to said second opening.

* * * * *